July 12, 1932.   J. B. HOWLE   1,867,262
FLUSH TANK VALVE SEAT
Filed May 13, 1931   2 Sheets-Sheet 1

Inventor
J. B. Howle

By Clarence A O'Brien
Attorney

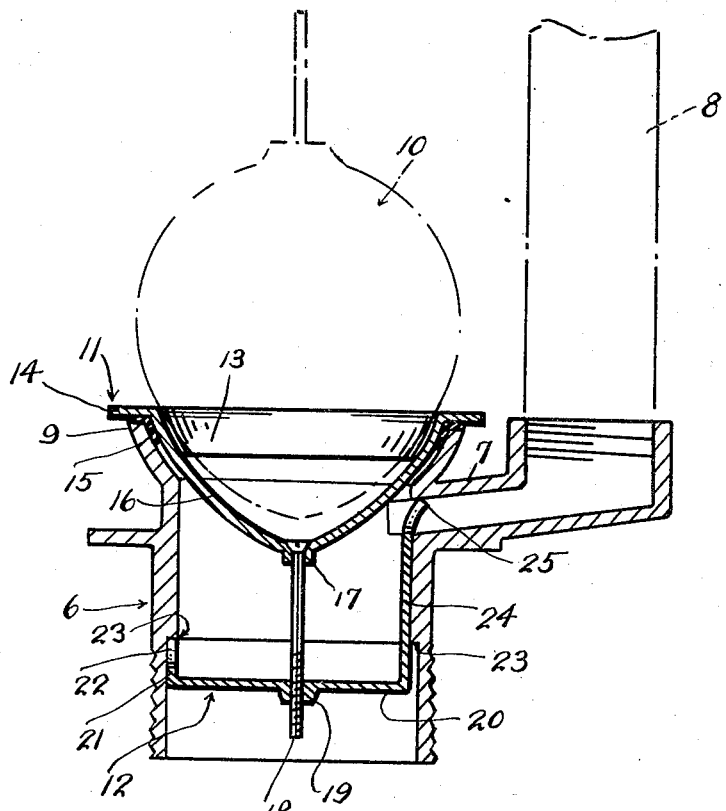

Patented July 12, 1932

1,867,262

UNITED STATES PATENT OFFICE

JAMES B. HOWLE, OF RICHMOND, VIRGINIA

FLUSH TANK VALVE SEAT

Application filed May 13, 1931. Serial No. 537,131.

This invention relates to plumbing supplies, and it has more particular reference to an accessory in the nature of a valve seat for use and association with the standard flush-tank of the type employing a rubber ball valve.

It is a matter of common knowledge that constant usage of the flush-tank destroys the effectiveness of the valve and minimizes the effectiveness of the casting which includes the valve seat. Inasmuch as it is rather expensive to replace the casting and valve, I have conceived of the idea of simplifying this replacement operation by providing a new type of renewable valve seat assembly.

My primary aim is to provide an accessory of this classification which is characterized by simplicity and efficiency, and which is capable of easy installation, and susceptible of fulfilling the requirements of a device of this class in a highly satisfactory and practical manner.

In the drawings:

Figure 3 is a vertical section on the line 3—3 of Figure 2.

Figure 4 is an elevational view of the valve seat element.

Figure 5 is a perspective view of the especially designed anchor for said valve seat element.

Figure 1:
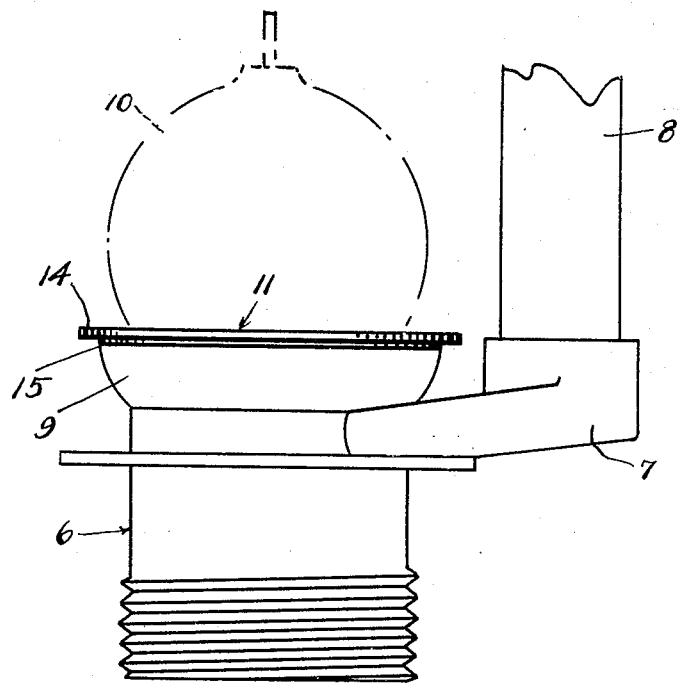
Figure 1 is an elevational view of a device constructed in accordance with the present invention.
Figure 2:
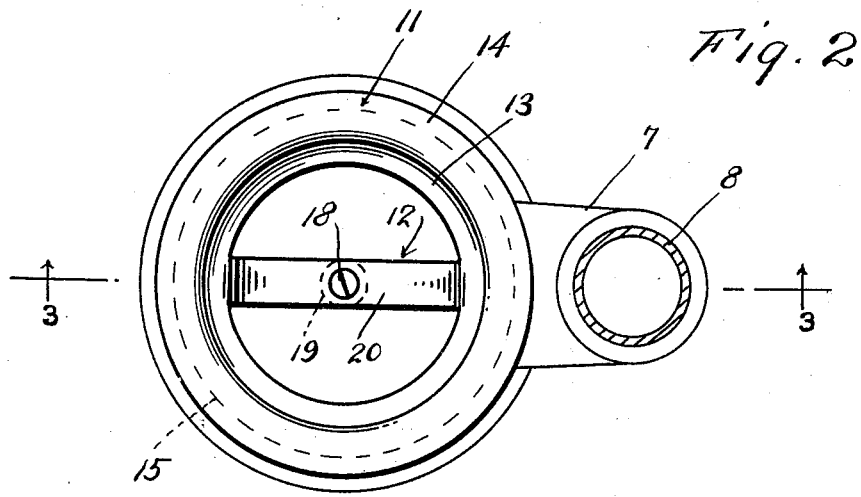
Figure 2 is a top plan view.

In the drawings, in Figures 1 and 3 for example, it will be noted that the conventional flush-tank casting is designated by the numeral 6. This embodies the usual lateral passage-equipped extension 7 to which the overflow pipe 8 is connected. Then too, at the top is the flared mouth 9 which constitutes a valve seat. The numeral 10 designates the usual ball valve.

The improved appliance or accessory is constructed primarily of three parts. First, there is the valve seat element designated by the numeral 11, the anchor indicated by the numeral 12 and the connecting means between these two parts 11 and 12.

The part 11 is constructed to co-operate with the existing or stock valve seat 9. It includes an annulus 13 of appropriate curvature to conform to the adjacent surface of the ball valve 10. Then too, it embodies a marginal outstanding flange 14 which rests on the valve seat 9. Interposed between the annulus 13 and the valve seat 9 is a packing ring or gasket 15 designed to provide a water-tight connection.

The numeral 16 designates a curvature or longitudinally bowed strap for anchoring purposes, and this has a central hole and a depending collar 17. Extending down through this hole and the collar is a connecting bolt 18. This bolt 18 is adapted to have its threaded end tapped into a screw-threaded boss 19 formed in the bight portion 20 of the general U-shaped anchor 12.

This U-shaped anchor includes an upstanding short arm 21 having the outwardly diverging furcations 22 serving as prongs to engage beneath a shoulder 23 constituting an existing detail of the standard casting 6. The long arm 24 has its upper end bifurcated and the furcations 25 are forked and curved so as to permit them to engage beneath the adjacent end portion of the passage in the part 7, as shown in Figure 3. Incidently, this U-shaped anchor 12 is of sufficient resiliency to allow it to be slipped down into the body portion of the casting whereby to permit the prongs 22 and 25 to be snapped beneath the adjacent shoulders.

When assembling the device for installation, all of the parts, namely the parts 11 and 12 and 18 are connected together and the entire unit is slipped down into place, and when in position the bolt 18 is tightened to draw the supplemental repair seat 13 down against the standard seat 9.

In this way a suitable inexpensive repair seat is provided, and through the use of this accessory, replacement of the ball valve and casting is entirely overcome.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. As a new product of manufacture, a repair seat for a flush tank valve comprising a unit including an annular seat, and an outstanding marginal flange, and an integral longitudinally bowed retaining strap, an anchor, a bolt connection between the anchor and central portion of said strap, said anchor being of general U-shaped form and embodying prong-equipped sustaining arms adapted to engage recesses in the walls of the valve outlet passage.

2. As a new product of manufacture, a reconditioning and repair accessory of the class described comprising a U-shaped anchor embodying a bight having a screw-threaded hole, a pair of upstanding parallel arms, one arm being comparatively short, and bifurcated at its free end to form retaining prongs adapted to engage recesses in the walls of the valve outlet passage, the remaining arm being comparatively long and bifurcated at its free end to form additional retaining prongs, a valve seat element, and a connecting bolt between said element and the screw-threaded hole in the bight portion of said anchor.

In testimony whereof I affix my signature.

JAMES B. HOWLE.